March 13, 1945.   P. M. SALERNI   2,371,589
HYDRAULIC POWER TRANSMISSION APPARATUS
Filed Aug. 12, 1939   7 Sheets-Sheet 1

INVENTOR:
PIERO MARIANO SALERNI
BY: Haseltine, Lake & Co.
ATTORNEYS

March 13, 1945.  P. M. SALERNI  2,371,589
HYDRAULIC POWER TRANSMISSION APPARATUS
Filed Aug. 12, 1939  7 Sheets-Sheet 2
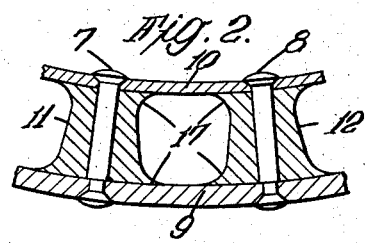
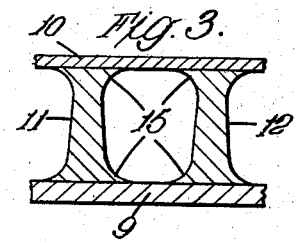
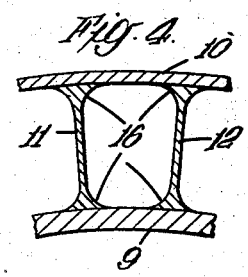
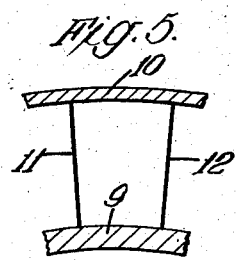
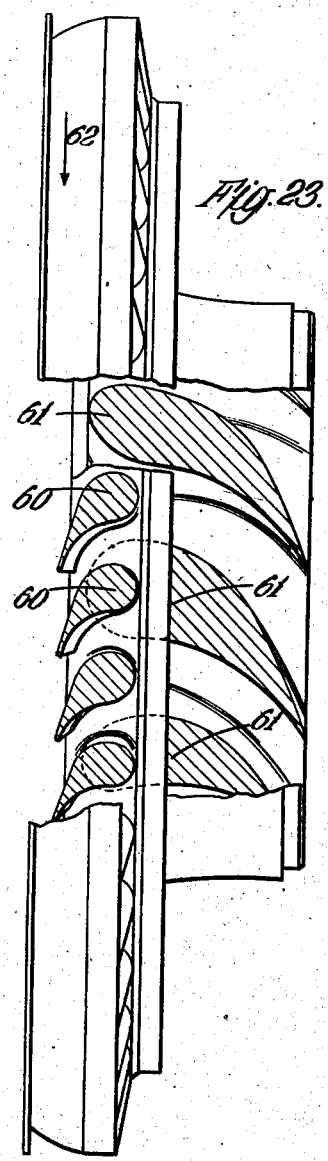
INVENTOR:
PIERO MARIANO SALERNI
BY: Haseltine, Lake & Co.
ATTORNEYS March 13, 1945. P. M. SALERNI 2,371,589
HYDRAULIC POWER TRANSMISSION APPARATUS
Filed Aug. 12, 1939 7 Sheets-Sheet 3
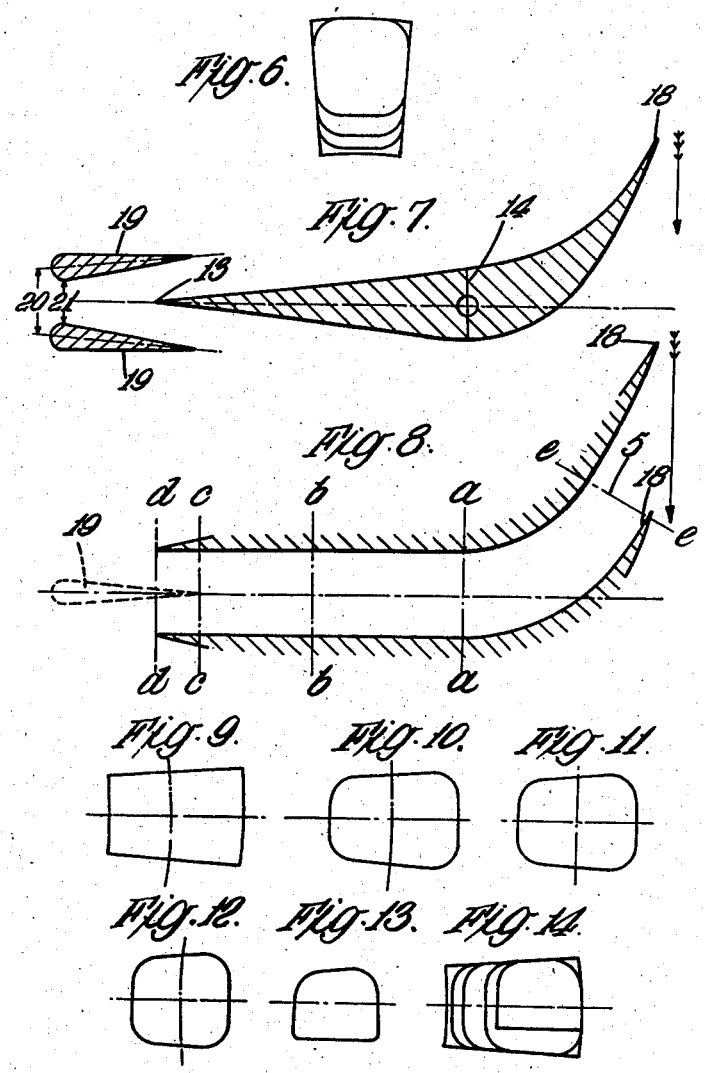
INVENTOR:
PIERO MARIANO SALERNI
BY: Haseltine, Lake & Co.
ATTORNEYS

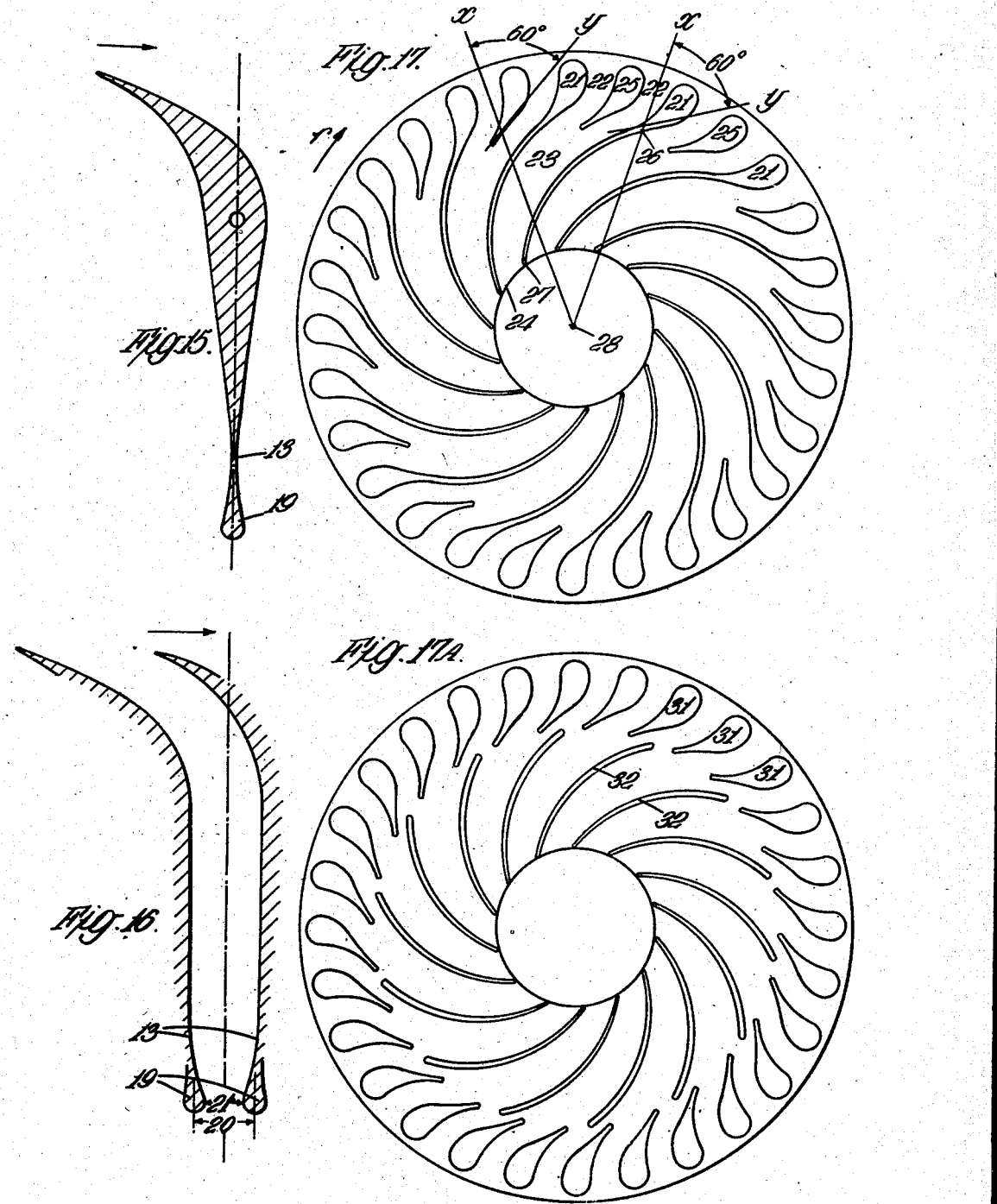

March 13, 1945. P. M. SALERNI 2,371,589
HYDRAULIC POWER TRANSMISSION APPARATUS
Filed Aug. 12, 1939 7 Sheets-Sheet 5

INVENTOR:
PIERO MARIANO SALERNI
BY: Haseltine, Lake & Co.
ATTORNEYS

March 13, 1945.　　　　P. M. SALERNI　　　　2,371,589
HYDRAULIC POWER TRANSMISSION APPARATUS
Filed Aug. 12, 1939　　　7 Sheets-Sheet 6
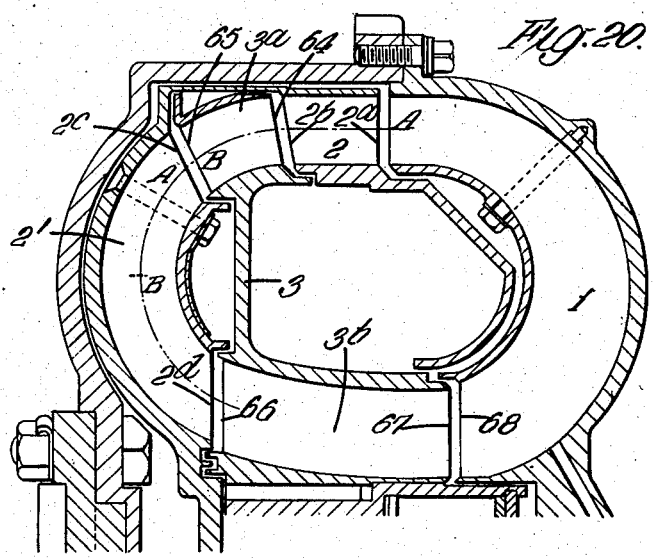
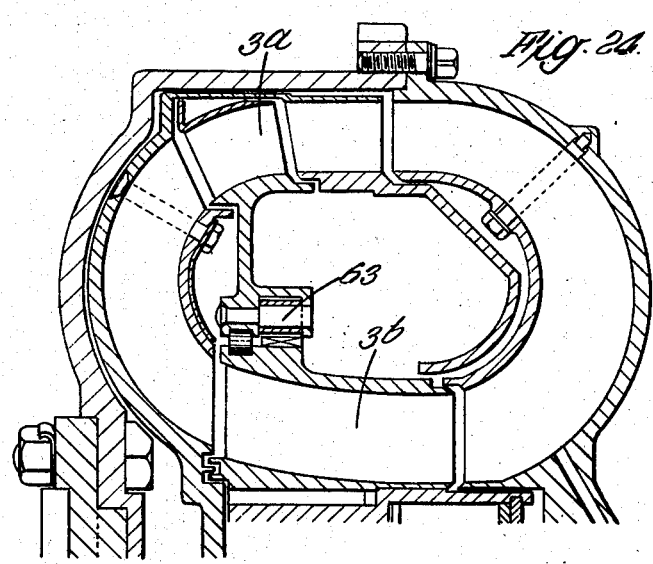
INVENTOR:
PIERO MARIANO SALERNI
BY: Haseltine, Lake & Co.
ATTORNEYS

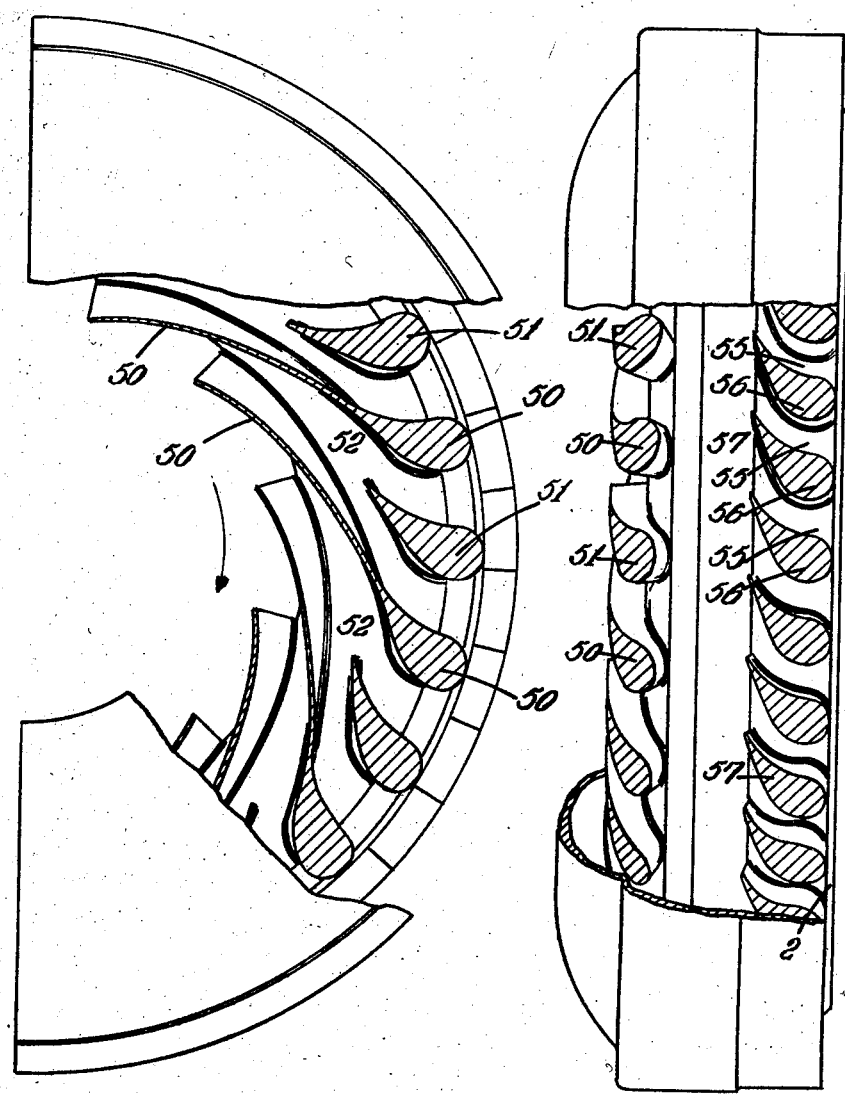

Patented Mar. 13, 1945

2,371,589

UNITED STATES PATENT OFFICE 2,371,589

HYDRAULIC POWER TRANSMISSION APPARATUS

Piero Mariano Salerni, Cox Green, Berkshire, England; vested in the Alien Property Custodian Application August 12, 1939, Serial No. 289,763
In Great Britain August 20, 1938

5 Claims. (Cl. 60—54)

This invention relates to hydraulic power transmission apparatus of the kind in which a rotary impeller or driving member having ducts between vanes drives by means of a liquid circulating in a closed circuit a turbine or driven member having ducts the inlets whereof are disposed in the said circuit at a radius (i. e. at a radial distance from the axis of rotation) larger than the radius at which their outlets are disposed, said ducts being formed between vanes which are not withdrawable from the liquid (and which are hereinafter referred to as "fixed vanes"), and which comprises a reaction member, and wherein the torque imparted by hydraulic means to the turbine in the forwards direction (i. e. in the direction of rotation of the impeller) is or can be substantially greater than that imparted to the impeller whereby transmission of power may be effected by hydraulic means at a torque ratio substantially greater than the ratio of 1 to 1 independently of any mechanical change speed gearing.

The object of the invention is to provide a transmitter of the kind referred to above, having certain features which, by their design and co-operation afford a stable or streamline flow throughout the liquid circuit, the various elements of the transmitter, that is, the pump or impeller, the turbine and the reaction member, a'l co-operating to ensure that the effect of the liquid making for steadiness of flow in or through any one of the elements is not impaired by the liquid meeting or passing through either of the other elements, so that in this manner turbulence or eddying is largely reduced thus avoiding losses due to turbulence and eddying, with the result that the efficiency of the transmitter is substantially increased.

In its real character the improved transmission apparatus hereof is adapted to serve as a complete drive, as for an automobile, such as can and does afford torque increase from impeller to turbine under certain drive conditions, wherein the reaction means or reactor functions importantly; thus under reduced speed driving conditions the driven torque effectively exceeds the driving torque, with maximum driven torque at starting or zero speed, and with the needed 'igh driven torque at low speed to overcome high load conditions, such as uphill; these characterizations distinguishing the transmitter hereof from a mere hydraulic coupling such as has been proposed in various forms. This application is a continuation in part of applicant's prior applications Serial Numbers 200,136, filed April 5, 1938, Patent Number 2,293,765, August 25, 1942, and 221,812, filed July 28, 1938, Patent Number 2,293,766, August 25, 1942, and 231,869, filed September 27, 1938, Patent Number 2,293,767, August 25, 1942.

The invention will now be described by way of example with reference to the accompanying drawings which show certain preferred embodiments of the invention.

Figures 2, 3, 4 and 5 are cross-sections of a duct on the lines A—A, B—B, C—C, and D—D respectively of Figure 1.

Figure 6 shows the cross-sectional areas of the duct sections of Figures 2, 3, 4 and 5 superimposed.

Figure 7 is a development of a vane on the line X—Y of Figure 1.

Figure 8 is a development of one duct on the line X—Y of Figure 1.

Figures 9, 10, 11, 12 and 13 show the cross-sectional area of a duct on the lines d—d, c—c, b—b, a—a and e—e of Figure 8 which correspond to the lines D—D, C—C, B—B, A—A, and the outlet, respectively, of Figure 1.

Figure 14 shows the cross-sectional areas of the duct sections of Figures 9, 10, 11, 12 and 13 superimposed.

Figure 15 is a development of a vane having a bulbous member as an extension at the inlet.

Figure 16 is a development of a duct between the two vanes as shown in Figure 15.

Figure 17 is a development in one plane of a turbine made according to this invention.

Figure 17a is a variant of the arrangement shown in Figure 17.

Figure 20 is a cross-section of a further embodiment of the invention through the axis of rotation which shows the liquid circuit.

Figure 21 is a part section view, part perspective view on the line B—B of Figure 20.

Figure 22 is a similar view to that shown in Figure 21 but on the line A—A of Figure 20. It will be noted that the views of Figures 21 and 22 overlap.

Figure 23 is a perspective view of the reaction member looking down on the top of Figure 20, parts being broken away to show the vanes.

Figure 24 shows a modification of Figure 20.

Figure 1:
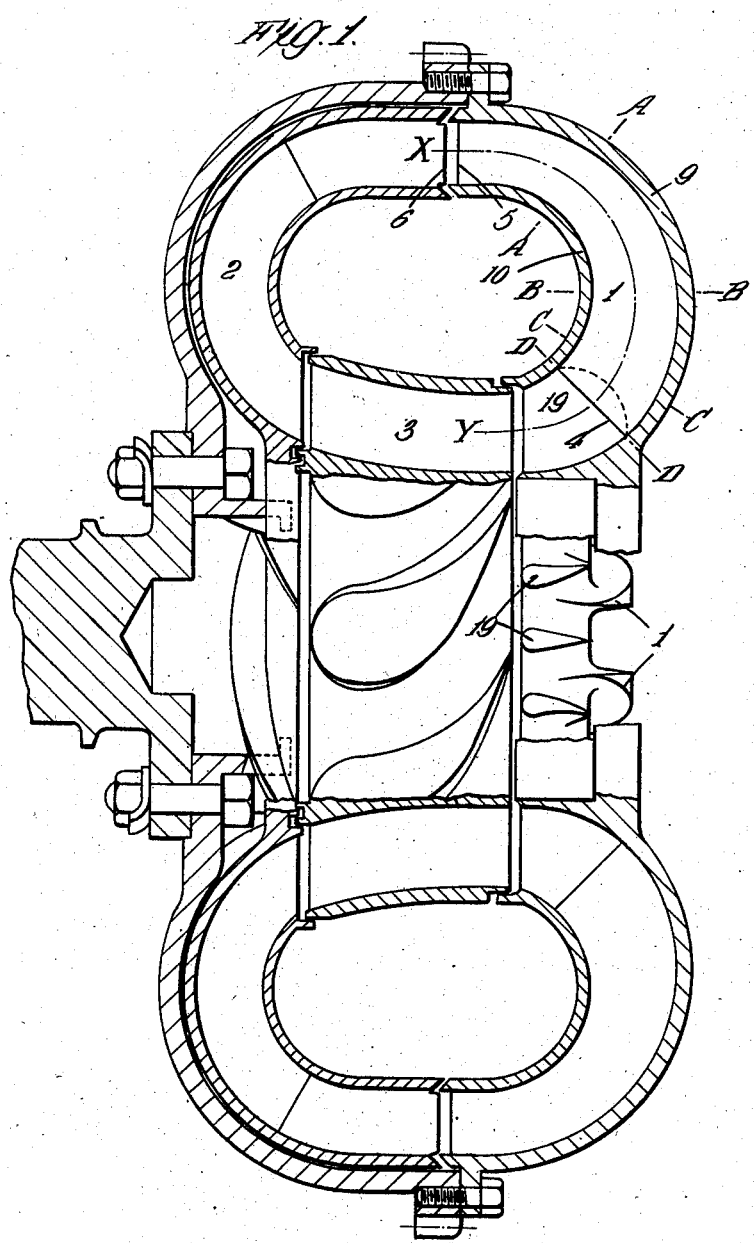
Figure 1 is a cross-section of an embodiment of the invention through the axis of rotation which shows the liquid circuit.

According to this invention there is provided a hydraulic power transmission apparatus of the kind specified in which the impeller has at least a substantial part of its ducts non-divergent and such non-divergence extends up to or nearly up to the outlet of the impeller and in which the turbine has bulbous members. By bulbous members are meant members which present to the impinging fluid bulbous heads so constructed as to reduce the eddying or turbulence due to the impinging of the fluid, from the various directions that occur in practice, upon the inlet ends of the vanes. Preferably the bulbous members are constructed and disposed so as to provide convergent passages between them so as to reduce any eddying or turbulence in the fluid passing between them.

An increase in efficiency is obtained by constructing the impeller so that at least a substantial part of its ducts is non-divergent, i. e. throughout that part any normal cross-section thereof can be superimposed upon every normal cross-section thereof which is more remote than itself from the outlet without overlapping the same. The greater the length of any non-divergent part of each duct the higher will be the efficiency and the length of such part must be substantial, i. e. it must be sufficiently long so as to increase the efficiency of the apparatus to a substantial extent. Such an increase in efficiency is caused by the reduction, due to non-divergence, in the eddying and turbulence of the liquid passing through and emerging from such non-divergent part. In this aspect of the invention, a non-divergent part of the impeller extends up to the outlet or nearly up to the outlet i. e. so near to the outlet that the liquid emerging from the impeller is less turbulent by reason of such non-divergence than it would otherwise be. A further increase in efficiency is caused by the turbine having at the inlets of its ducts bulbous members so constructed and disposed as to reduce eddying and turbulence. If the length of such non-divergent part and the decrease in its cross-sectional area throughout its length is sufficient, then the liquid emerging from the impeller will have a stable flow i. e. it will be free from eddying and turbulence or sufficiently free not substantially to reduce efficiency, even under conditions where the apparatus is transmitting at ratios of greater than 1 to 1 and with at least 25% of the maximum power which the engine is designed to give under ordinary conditions.

According to another aspect of this invention there is provided a hydraulic power transmission apparatus of the kind specified in which the ducts of the impeller are constructed so as to have at least a part thereof non-divergent and so that the fluid emerging therefrom has a stable flow under the conditions specified above, and in which the turbine has at the inlets of its ducts bulbous members.

According to further features of the invention the impeller and also the reaction member have at the inlets of their ducts bulbous members constructed and disposed so as to reduce eddying and turbulence.

Preferably all of the aforesaid bulbous members are constructed and disposed so as both to reduce any eddying and turbulence due to the impingement thereon of the fluid from the various directions which will occur in practice and also so as to provide convergent passages between adjoining members further to reduce any eddying and turbulence in the fluid passing between them.

Preferably the impeller has its outlet in the outer half of the circuit and the ducts of the impeller are made non-divergent from a point at or near the inlet up to the outlet. Preferably the cross-sectional area is progressively reduced throughout such length.

The cross-sectional area may be made to decrease in the case of a tetragonal duct either by causing both pairs of opposite walls to converge or by keeping one pair parallel and causing the other pair to converge. If the liquid used has a high viscosity, e. g. as in the case of common engine lubricating oil, if one pair of opposite walls has a convergence of 5° while the other pair remains parallel, a substantial advantage is obtained. Up to a limit (which is at least 15°) the greater the degree of convergence the better will be the result.

The construction of the apparatus itself imposes limits to the possible amount by which the cross-sectional area can be reduced towards the outlet of the impeller. Thus the outlet must not be unduly constricted as otherwise the liquid will not be able to circulate sufficiently freely to transmit power efficiently. Moreover, the permissible largeness of the inlet of the impeller is limited by considerations of the design of the circuit, since there must not be inordinate discrepancies in size between the dimensions of the channel through which the liquid is delivered to the impeller and the inlet of the impeller.

In the preferred construction the ducts have their outlets at the part of the circuit furthest away from the axis of rotation, so that the liquid issues therefrom in a direction having no radial component. In the preferred construction the ducts extend throughout practically the full radial dimension of the circuit and are curved also towards the inlet. The radius of the outside curve preferably at no point exceeds about twice the radius of the inner curve as otherwise there might be a tendency to eddying and turbulence from this cause. This requirement also, therefore, imposes a limit on the permissible largeness of the inlet.

The reduction of cross-sectional area towards the outlet is preferably as great as possible consistent with the above considerations.

Of the non-divergent part of each duct that portion which lies nearer the inlet is preferably made non-divergent by progressively thickening the vanes of the impeller (i. e. the parts forming the walls separating a duct from adjoining ducts) in the direction towards the outlet. The vanes can be made integral with the impeller but it is convenient to make them separately and to assemble them upon the body of the impeller. Preferably the cross-sectional area is simultaneously progressively reduced and preferably this is accomplished by causing the inner and outer walls of the duct to converge.

It is preferred to form the outlet of each duct in such a manner that the stream issuing from a duct becomes merged gradually with those issuing from the adjoining ducts without objectionable eddying or turbulence. In order to achieve this the thickness of the vanes must be progressively decreased towards the outlet. This can be accomplished, while maintaining non-divergence, by turning the vanes as they approach the outlet. The turn should be backwards relative to the direction of rotation. Preferably this backwards turn takes place only in that portion of each duct of the impeller which lies nearer to the outlet and preferably in the outer half of the circuit, and preferably in that portion the turn is sufficient to cause the walls constituted by the vanes to converge. Preferably the vanes are radially disposed elsewhere. It will be understood that the extent to which the vanes are turned backwards must not be so great that power is no longer efficiently transmitted (the optimum angle to which the vanes are turned relative to the direction of rotation usually lies between 30° and 60°) and therefore if the vanes are turned backwardly much before they approach the outlet of the ducts, since the thickness of the vanes can only be got rid of without divergence by further backward turning, the opportunity for so doing is correspondingly reduced.

It is preferred that the turbine should have ducts which have a backward curvature in a part commencing at or near their inlets (i. e. are curved so as to deflect the liquid as it flows through this part in a direction having a component relative to the turbine opposite to the direction of rotation of the impeller) and thereafter have a general curvature opposite to such first mentioned curvature.

Preferably the whole of this backward curvature should take place as near as practicable to the inlet of the turbine. It has been found in practice that a duct the direction of which at the inlet of the turbine is approximately parallel to a plane containing the axis of rotation and the direction of which at the end of the backwardly curved part remote from such inlet is at an angle of about 60° to such a plane is satisfactory. It will be obvious that the part of the duct curved in this manner must be of sufficient length to enable the liquid to be turned backwards effectively without narrowing the ducts excessively.

From the point at which the backwards curvature terminates up to or nearly up to the outlet, the duct has a general curvature in a direction opposite to the said backwards curvature, i. e. this latter part of the duct, regarded as a whole, is oppositely curved. Preferably the whole of this latter part is oppositely curved, and preferably the curvature is smooth and such as to conform to what would be the natural path of the flow of the liquid after leaving the backwardly curved part, when the turbine is stationary, if the liquid were unrestrained by vanes in this part of the turbine, i. e. if the part of the vanes forming this part of the ducts were not there; which statement will be clear by considering upon Fig. 1 that the liquid in the complete set of streams must find its way to the inner outlets where they deliver to the reactor member, and the streams therefore constrain each other to take a curved inward path, with which the illustrated ducts substantially correspond.

When the turbine is stationary, i. e. before it has begun to move angularly, the reaction due to the deflection of the liquid backwards, as it flows through the backwardly curved parts of the ducts, tends to rotate the turbine.

When the turbine rotates, power is transmitted also by the liquid being forced from the periphery of the turbine towards the axis. For the purpose of transmission by this method, it is desirable that the inlet and outlet of the ducts formed between the vanes shall be separated by as great a radial distance as practicable. The ducts must accordingly extend throughout a substantial radial height and preferably throughout almost the full radial height of the circuit, as shown.

The ducts may be formed between vanes which are continuous from the inlet of the turbine to the outlet. But the vanes need not be continuous and the ducts may be formed between successive annular series of vanes, which may be staggered or not, provided that there is not such a gap as will result in undue shock and loss of efficiency. Preferably additional relatively short backwardly curved vanes are provided at or near to the inlet.

In a modified construction, the said ducts are preceded by one or more sets of auxiliary ducts (also formed between fixed vanes) which are backwardly curved and which are separated from the said ducts and from each other by spaces adapted to receive reaction vanes.

A reaction member has reaction vanes so constructed and arranged at such an angle to the direction of the liquid impinging upon them that under certain conditions of operation (e. g. when the turbine is stationary, and it is desired to produce an increased torque for the purpose of starting) these impart to the liquid a component of velocity in a forwards direction (i. e. the same direction as the direction of rotation of the impeller). Under such conditions the reaction vanes are operative and tend to be driven by the liquid in a backwards direction and must be restrained against such tendency in order to deflect the liquid in a forwards direction. It is preferable that the ducts of the impeller, turbine and reaction member and the bulbous members should be so constructed that the fluid has a stable flow throughout the circuit under the conditions specified.

As the turbine begins to rotate and the difference between the speeds of the turbine and of the impeller is reduced this tendency decreases and ultimately the reaction vanes may be driven by the liquid in a forwards direction and are then inoperative. When, however, the reaction vanes are driven by the liquid in a forwards direction, their angular disposition tends to cause them to rotate at a slower speed than that of the turbine. If the reaction vanes rotate at a substantially different speed from that of the turbine this adversely affects the efficiency.

In order to reduce this loss of efficiency, it is preferable that the reaction member should be capable of rotation in a forwards direction, and should be so constructed that it, or if it has more than one reaction element then at least one such element, should have the radial distance from the axis of rotation of the middle points of the inlets between its vanes slightly greater than the radial distance from such axis of the middle points of the corresponding outlets.

In order to provide a large starting torque and also the possibility of obtaining a torque ratio considerably greater than 1 to 1 over a wide range of speeds, it has been found necessary to employ at least two reaction elements, each having a set of reaction vanes, one of which precedes and the other of which follows a set of turbine vanes in the circuit. If both sets of reaction vanes, when they become inoperative, rotate in a forwards direction at a substantially different speed from that of the turbine, the efficiency will be seriously impaired.

It is therefore preferable that there should be provided at least two reaction elements between which is interposed at least one set of turbine vanes, which reaction elements are capable of rotation relatively to each other and of which at least one is such that the radial distance, from the axis of rotation, of the middle points of the inlets between its vanes is slightly greater than the radial distance from such axis of the middle points of the corresponding outlets.

The said difference of radial distance must be slight, i. e. such that when the reaction vanes are rotating in a forwards direction the difference between the speed at which the liquid drives or tends to drive the said reaction vanes and the speed of the turbine is less than it would be if the radial distances from the axis of rotation of the middle points of the said inlets and outlets were the same. Preferably the said difference of radial distances is such that when the apparatus is transmitting the maximum available power under such conditions that said reaction vanes rotate in a forward direction they are driven or tend to be driven in a forwards direction by the liquid substantially at the same speed of rotation as the turbine. If the said difference of radial distance is too large, the reaction member will be driven considerably faster than the turbine with consequent loss of efficiency.

Preferably each reaction element is constructed as aforesaid.

In Figure 1, 1 is the impeller, 2 is the turbine and 3 is the reaction member. When the impeller 1 is rotated by any prime mover, liquid flows therein by centrifugal action from the inlet 4 thereof to the outlet 5 thereof whence it is discharged into the inlet 6 of the turbine through which it flows in a radially inwards direction imparting rotational movement thereto. The outlet 5 is preferably situated in the outer half of the circuit, i. e. on that side of the line B—B which is remote from the axis of rotation, and in the embodiment shown is situated at the major radius of the circuit.

The outer and inner walls of the ducts in the impeller are formed by the members 9 and 10 and the side walls are formed by the vanes 11, 12. 7 and 8 are rivets securing these vanes to the members 9 and 10.

At the inlet (Figure 5) the vanes are thin and the cross-sectional area of the ducts of the impeller is at a maximum. The thickness of the vanes is thereafter progressively increased as shown in Figures 4, 3 and 2 so as to maintain the walls of the ducts formed by the vanes 11 and 12 non-divergent, notwithstanding that the vanes are extending radially outwards from the axis of rotation. The walls 9 and 10 are progressively brought closer together to reduce the cross-sectional area, the height of the vanes being accordingly reduced. Figure 6 shows the successive cross-sections of the duct superimposed and it will be seen that the side walls remain the same distance apart while the top and bottom walls are converging. The vanes have been thickened as shown in Figure 7 from the point 13 at the inlet to the point 14 corresponding to the line A—A of Figure 1.

Thereafter from the point 14, the vane is turned backwards towards the outlet so that the thickness of the vane may be progressively reduced while the duct remains non-divergent as shown in Figure 8. In the embodiment illustrated, in the latter part of each duct, i. e. from the line a—a (Figure 8) to the outlet, the sides of the duct constituted by the vanes converge (the backwards turn being sufficient for this purpose) and the walls of the duct formed by the members 9 and 10 are maintained parallel, or at least substantially parallel for a substantial final extent of duct as seen in Fig. 1.

The vanes are progressively rounded as shown at 15 (Figure 4), 16 (Figure 3) and 17 (Figure 2) in order that the duct which is tetragonal at the inlet and the outlet may not have sharp corners throughout the greater part of its length. This accounts for the D-shaped cross-section of the outlet shown in Figure 13 on the line e—e of Figure 8. One side of the outlet is constituted by a part of a vane which is some distance from the tip and is still somewhat rounded, while the other side is constituted by the tip of a vane which has there ceased to be rounded.

The radius of curvature of the part 9 should not be more than about twice the radius of curvature of the part 10.

In order to avoid or decrease losses due to shock at the inlet the latter is preferably disposed at as little a distance as possible from the discharge outlet of the member through which the liquid has passed previously to entering the impeller. Bulbous members 19 (Figures 7, 8, 15 and 16) are placed at or near the inlet in fixed relation to the vanes of the impeller being as shown so constructed and disposed as to reduce any eddying and turbulence due to the impingement thereon of the fluid from the various directions which will occur in practice. These members also rapidly constrict the space through which the liquid must pass before entering the inlet, i. e. from 20 to 21, thus providing a convergent passage which will further reduce eddying and turbulence. Thereafter a gradual expansion of such space takes place up to the inlet, which must, as pointed out previously, be relatively large in order to permit a progressive reduction of cross-sectional area throughout each duct of the impeller from the inlet 4 to the outlet 5. Although the said gradual expansion up to the inlet tends to reduce some eddying and turbulence, the total amount thereof is smaller than that which would result from shock in the absence of the members 19 and of the initial constriction caused by the bulbous ends thereof as stated above.

The preferred construction and disposition of the bulbous members is shown in Figures 15 and 16 where the members 19 are formed as integral extensions of the vanes, but they may be offset as shown in Figures 7 and 8.

Referring to Figure 17–21, 26, 27 indicate one of the fixed vanes having a bulbous head 21 near the inlet of the duct 23 which will operate in a similar manner to that described above with reference to the bulbous members at the inlet of the impeller. 24 is the outlet of the duct 23, which outlet is situated nearer the axis 28 of the turbine than the inlet. 25, 25 are short fixed vanes placed between the bulbous heads 21, 21 of the full length vanes, which vanes are of similar shape to the part 21 of the full length vanes 21, 26, 27. In the part 22 of the duct 23 which part is near the inlet (and in the embodiment shown is divided into two by the vanes 25, 25) the duct is curved backwards, the direction of rotation being shown by the arrow $r$. The change of direction imparted to the liquid in the part 22 is the angle between the lines $x$ and $y$ which in the example shown is about 60°. Thereafter the duct is oppositely curved in such a manner as to conform to what would be the direction of flow of the liquid in this part of the turbine before the turbine has begun to move if the part of each vane from 26 to 27 were absent.

In the modified construction shown in Figure 17a, which may be more convenient to manufacture, the ducts are constituted by two series of vanes, viz. an outer series 31, 31 and an inner series 32, 32. The outer series 31, 31 which are situated near the inlet have a backwards curvature and the inner series 32, 32 which extend to the outlet are oppositely curved. The radial gap between the series 31, 31 and the series 32, 32 is sufficiently small to avoid undue shock.

Referring to Figure 1 it will be observed that the ducts of the turbine 2 extend throughout almost the full radial height of the circuit.

Figure 18:
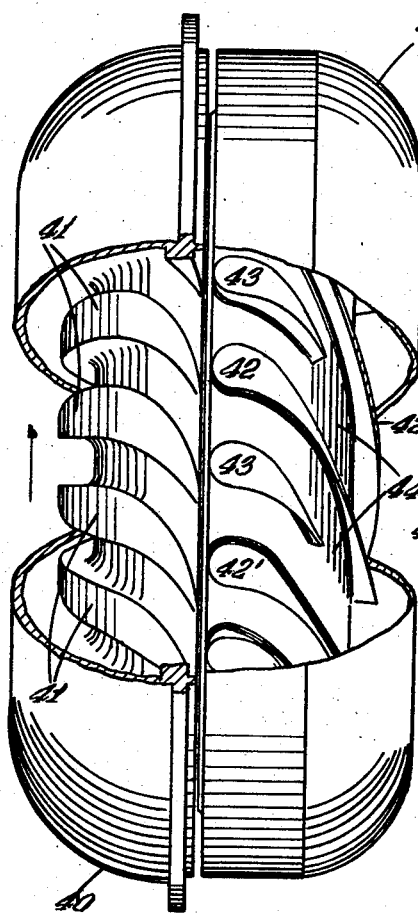
Figure 18 is a perspective view of parts of the impeller and of the turbine seen from a direction at right angles to the axis of rotation.
Figure 19:
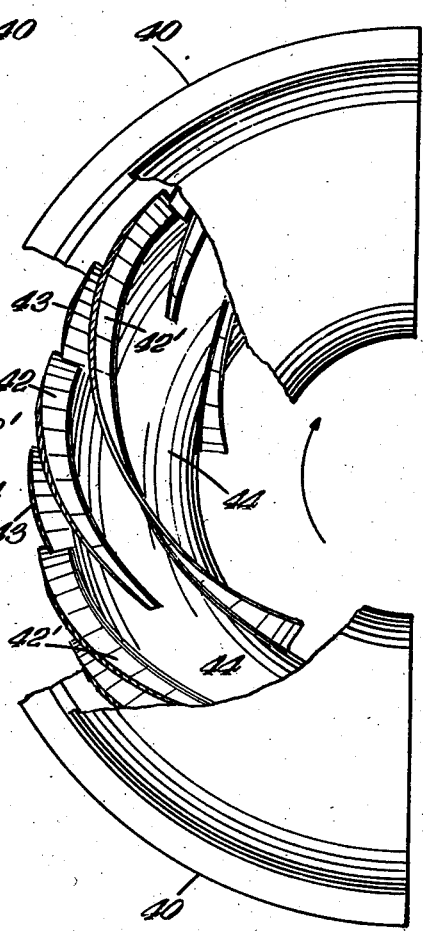
Figure 19 is a perspective view of another part of the turbine seen from a direction parallel to the axis.

Referring to Figures 18 and 19, 40 is the outer casing of the apparatus, 41, 41 are the delivery ends of the vanes of the impeller, and 42, 42$^1$ and 43 are vanes of the turbine. In the embodiment shown in these figures the vanes 42$^1$ extend from the inlet of the turbine to the outlet, while the vanes 42 are somewhat shorter but otherwise similar. The vanes 43 are still shorter. 44, 44 are the ducts which are formed between the full length vanes 42' and subdivided by the part length vanes 42, which ducts by reason of the curvature of these vanes are backwardly curved near the inlet and thereafter oppositely curved up to the outlet. The short vanes 43 are similar to the vanes 25 of Figure 17 and the vanes 42 and 42$^1$ to the vanes 21 of Figure 17.

Referring to Figure 20, which shows a modification, 1 is the impeller, the construction of which is the same as in Figures 1–16, but the turbine now consists of two parts 2, 2$^1$ and the reaction member 3 also of two parts 3a and 3b, the part 3a of the reaction member being inserted between the parts 2, 2$^1$ of the turbine whilst the other part 3b is located between the outlet of the turbine and the inlet of the impeller. Referring to Figures 21 and 22, Figure 21 shows the vanes of the turbine part 2$^1$ (Figure 20) and Figure 22 shows the inlet ends of these vanes as well as a set of vanes 56 on the turbine part 2. 50, 50 are vanes which extend from the inlet to the outlet of the turbine part 2$^1$ and which are shaped to form between them the ducts 52 which are backwardly curved near the inlet and thereafter oppositely curved as in the previous construction. 51 indicate short vanes similar to the vanes 25 in Figure 17. As shown in Figure 22, the turbine has a set of auxiliary ducts 55, formed between the auxiliary vanes 56, preferably integral with the turbine part 2, which ducts 55 and vanes 56 precede the main ducts 52 and vanes 50 that extend throughout almost the full radial height of the circuit. The ducts 55 and the vanes 56 of the auxiliary set are backwardly curved and are situated at a part of the circuit most remote from the axis. The reaction due to the backwards curvature of the auxiliary set of ducts assists to rotate the turbine. The vanes of the part 3a (Figure 20) of the reaction member are interposed in the space 57 between the auxiliary set of turbine vanes 56 and the main turbine vanes 50, 51 and these reaction vanes are so curved as to deflect the flow of the liquid forwardly, i. e. to the same direction as the direction of rotation and consequently the backwards curvature of the part near the inlet of the ducts 52 operates as before to tend to rotate the turbine, notwithstanding the presence of the preceding set of backwardly curved auxiliary ducts 55. One or more additional preceding sets of ducts and vanes can be similarly added, with reaction members between each set, to increase the starting effort if this is desired.

Referring to Figure 20, the liquid enters between the turbine vanes 2 by the inlets 2a and leaves by the outlets 2b, the turbine vanes being so disposed that, as the liquid flows through, the turbine tends to rotate forwardly and the direction of flow of the liquid is turned backwardly. The liquid then enters between the reaction vanes 3a by the inlets 64, the reaction vanes (as shown at 60, 60, Figure 23) being so disposed as to change the direction of flow of the liquid again to a forwards direction. The direction of rotation of the impeller is shown by the arrow 62, Figure 23. The reaction elements when operative are prevented from rotation in a backwards direction by any suitable means (not shown). The liquid leaves the reaction vanes 3a by the outlets 65 and enters between the turbine vanes 2$^1$ by the inlets 2c, and leaves by the outlets 2d and enters between the reaction vanes 3b (also shown at 61, 61 Figure 23) by the inlets 66 and leaves by the outlets 67, whence it passes into the inlets 68 of the impeller 1.

The turbine vanes 2$^1$ and the reaction vanes 3b operate in a manner similar to that of the turbine and reaction vanes 2 and 3a respectively.

In the embodiment of the invention illustrated, the radial distance of the middle points of the inlets 64, 66 from the axis of rotation, indicated by XX, is slightly greater than that of the middle points of the corresponding outlets 65, 67 respectively.

The difference in the radial distance from the said axis of the middle points of the inlets 64 and 66 and of the corresponding outlets 65 and 67, respectively, preferably is such that, when the apparatus is transmitting the maximum available power under such conditions that said reaction vanes rotate in a forward direction they are driven or tend to be driven by the liquid in a forwards direction substantially at the same speed of rotation as the turbine.

This feature may be elucidated as follows, its utility pertaining particularly to conditions when driving under high power and at full speed or unit ratio, or substantially so. With an ordinary reactor, for example as shown in applicant's prior Patents Nos. 2,122,353 of June 28, 1938 and 2,173,428 of September 19, 1939, while the liquid issuing from the turbine, at high speed unit ratio, delivers a forward drive to the reactor, still the reactor turns at a considerably lower speed than the turbine. Due to the curvature of the reactor vanes, away from radial planes, the reactor has a strong tendency to lag, in the toroidal flow, and this reduced reactor speed is found to interfere with the cooperation and flow between turbine and impeller, with loss of efficiency. The described novel feature in the present invention tends to offset the reduced-speed tendency of the reactor by causing a forward-drive tendency, due to the arrangement of the reactor duct entrances at a slightly greater radius than their outlets, or the middle or mean points thereof. Thus by the structure shown in Fig. 1 there is afforded a reactor rotary speed substantially the same as that of the impeller and turbine, so that at unit ratio all three turn in substantial unison, substantially the equivalent of a positive drive connection between engine and vehicle wheels, the full speed rotation of the reactor avoiding any interference with the flow of the liquid across from the turbine to the impeller. Under these conditions the reactor performs in effect like an inefficient turbine, developing enough power to insure its own rotation at a speed substantially equalling that of the impeller and turbine. The liquid has to pass with centripetal trend through the reactor ducts, so that centrifugal force resists the flow and causes lateral reactions against the vanes, producing the forward drive tendency that may neutralize the lag tendency, and give a speed substantially equal to the turbine speed, as the reactor, under these unit-ratio conditions, swims idly through the toroidal flow.

In the embodiment illustrated in Figure 24 the reaction element 3ᵃ is rotatably mounted in such a manner that it can rotate in a forwards direction independently of the reaction element 3ᵇ but is prevented by the ratchet and pawl device 63 from relative rotation in a backwards direction. The reaction element 3ᵇ is prevented from rotation in a backwards direction relative to the fixed casing by any suitable means (not shown).

The vanes of the reaction member are formed with bulbous members at the inlets as indicated for example in Figure 1 and in Figure 23 of the accompanying drawings which will operate in a similar manner to those described with reference to the bulbous members at the inlet of the impeller.

The arrangement of the vanes and the relative sizes of the various parts shown in the figures have been found in practice to be satisfactory in the application of the invention to an automobile.

What I claim and desire to secure by Letters Patent of the United States is:

1. A hydraulic power transmitter of the kind which constitutes per se a drive apparatus that is adapted to give torque increase under reduced and zero speed conditions, the same having an impeller member, a turbine member and a reactor member, each comprising duct-forming walls or vanes and each rotatable about the common axis, with a liquid mass confined to flow around a closed toroidal circuit first outwardly with respect to the rotation axis through the impeller ducts and thence by discharge as an annular stream with axial component toward the turbine ducts and inwardly through the turbine ducts with final turbine discharge to enter reactor ducts and therefrom back into the impeller ducts; characterized as to the impeller that its walls are of form to define ducts each of which at every point substantially from inlet to outlet has a sectional shape both dimensions of which, between each pair of walls, are at least as short as at every preceding point, and the outer portions of such ducts being curved progressively away from a radial plane to an angle to cause adjacent ducts to approach and merge at their outlets for smooth confluence of the issuing streams; and characterized as to the turbine that it has walls that are of form to define inwardly extending ducts each of which in development, from its inlet near the major radius of the circuit, has a two-part curve of the character of a long-S curve, the first part of such curve being backcurved away from a radial plane in a direction opposite to the forward rotation of the impeller, and its second part being of curvature in the reverse sense extending to the turbine outlet near the minor radius of the circuit; and characterized as to the reactor that it is mounted for forward but against backward rotation and that its walls are of form to define ducts the inlet mean points of which are at a slightly greater radius than its outlet mean points; whereby the liquid travels with high stability and freedom from turbulence throughout its complete toroidal circuit while the successive rotary members mutually cooperate therein for the delivery of efficient torque thrust from impeller to turbine at various speed and torque ratios.

2. A hydraulic power transmitter of the kind which constitutes per se a drive apparatus that is adapted to give torque increase under reduced and zero speed conditions, the same having an impeller member, a turbine member and a reactor member, each comprising duct-forming walls or vanes and each rotatable about the common axis, with a liquid mass confined to flow around a closed toroidal circuit first outwardly with respect to the rotation axis through the impeller ducts and thence by discharge as an annular stream with axial component toward the turbine ducts and inwardly through the turbine ducts with final turbine discharge to enter reactor ducts and therefrom back into the impeller ducts; characterized as to the impeller that its walls are of form to define ducts each of which is free of divergence substantially from inlet to outlet, and the outer portions of such ducts being curved progressively away from a radial plane to an angle to cause adjacent ducts to approach and merge at their outlets for smooth confluence of the issuing streams; and characterized as to the turbine that it has walls that are of form to define inwardly extending ducts each of which in development, from its inlet near the major radius of the circuit, has a curvature extending to the turbine outlet near the minor radius of the circuit; and characterized as to the reactor that it is mounted for forward but against backward rotation and that its walls are of form to define ducts adapted to control interflow from the turbine back to the impeller; and characterized further in that at least one of said members, impeller, turbine and reactor, is provided at its duct inlets with a series of bulbous formations or enlargements defining converging inflow passages between them leading into the inlets and tending to restrict eddying of liquid; whereby the liquid travels with high stability and freedom from turbulence throughout its complete toroidal circuit while the successive rotary members mutually co-operate therein for the delivery of efficient torque thrust from impeller to turbine at various speed and torque ratios.

3. A transmitter as in claim 2 set forth and wherein each of the members, impeller and turbine and reactor has such bulbous inlet enlargements, for minimum turbulence throughout the toroidal circuit.

4. A hydraulic power transmitter of the kind which constitutes per se a drive apparatus that is adapted to give torque increase under reduced and zero speed conditions, the same having an impeller member, a turbine member and a reactor member, each comprising duct-forming walls or vanes and each rotatable about the common axis, with a liquid mass confined to flow around a closed toroidal circuit first outwardly with respect to the rotation axis through the impeller ducts and thence by discharge as an annular stream with axial component toward the turbine ducts and inwardly through the turbine ducts with final turbine discharge to enter reactor ducts and therefrom back into the impeller ducts; characterized as to the impeller that its walls are of form to define ducts each of which is free of divergence substantially from inlet to outlet, and the outer portions of such ducts being curved progressively away from a radial plane to an angle to cause adjacent ducts to approach and merge at their outlets for smooth confluence of the issuing streams; and characterized as to the turbine that it is interrupted with a first section spaced from a second section, and the latter has walls that are of form to define inwardly extending ducts each of which in development, from its inlet near the major radius of the circuit, has a two-part curve of which the first part is backcurved away from a radial plane in a direction opposite to the forward rotation of the impeller, and the second part is of curvature in the reverse sense extending to the turbine outlet near the minor radius of the circuit; and characterized as to the reactor that it is formed with a main and an auxiliary unit mounted for forward but against backward rotation and that said auxiliary unit occupies the space between the sections of the turbine and that the walls of the main reactor unit are of form to define ducts the inlet mean points of which are at a slightly greater radius than its outlet mean points; whereby the liquid travels with high stability and freedom from turbulence throughout its complete toroidal circuit while the successive rotary members mutually cooperate therein for the delivery of efficient torque thrust from impeller to turbine at various speed and torque ratios.

5. A hydraulic power transmitter of the kind which constitutes per se a drive apparatus that is adapted to give torque increase under reduced and zero speed conditions, the same having an impeller member, a turbine member and a reactor member, each comprising duct-forming walls or vanes and each rotatable about the common axis, with a liquid mass confined to flow around a closed toroidal circuit first outwardly with respect to the rotation axis through the impeller ducts and thence by discharge as an annular stream with axial component toward the turbine ducts and inwardly through the turbine ducts with final turbine discharge to enter reactor ducts and therefrom back into the impeller ducts; characterized as to the impeller that its walls are of form to define ducts each of which is free of divergence substantially from inlet to outlet, and the outer portions of such ducts being curved progressively away from a radial plane to an angle to cause adjacent ducts to approach and merge at their outlets for smooth confluence of the issuing streams; and characterized as to the turbine that it is interrupted with a first section spaced from a second section, and the latter has walls that are of form to define inwardly extending ducts each of which in development, from its inlet near the major radius of the circuit, has a two-part curve of which the first part is backcurved away from a radial plane in a direction opposite to the forward rotation of the impeller, and the second part is of curvature in the reverse sense extending to the turbine outlet near the minor radius of the circuit; and characterized as to the reactor that it comprises a main reactor unit mounted for forward but against backward rotation and an auxiliary unit which occupies the turbine space and is mounted for forward rotation relatively to the main unit; whereby the liquid travels with high stability and freedom from turbulence throughout its complete toroidal circuit while the successive rotary members mutually cooperate therein for the delivery of efficient torque thrust from impeller to turbine at various speed and torque ratios.

PIERO MARIANO SALERNI.